United States Patent [19]
Ostdiek

[11] 3,859,858
[45] Jan. 14, 1975

[54] SURFACE ANGLE-OF-ATTACK DETECTOR

[76] Inventor: Arthur J. Ostdiek, 12224 Dalewood Dr., Wheaton, Md. 20902

[22] Filed: June 21, 1973

[21] Appl. No.: 372,138

[52] U.S. Cl. .................................................. 73/505
[51] Int. Cl. ............................................ G01p 3/26
[58] Field of Search .............. 73/180, 188, 189, 505

[56] References Cited
UNITED STATES PATENTS

| | | | |
|---|---|---|---|
| 2,590,521 | 3/1952 | Dyche, Jr. | 73/180 |
| 3,452,707 | 7/1969 | Warren | 73/180 |
| 3,468,327 | 9/1969 | Jones et al. | 73/505 |
| 3,530,725 | 9/1970 | Schmidlin et al. | 73/505 |
| 3,600,930 | 8/1971 | Posingies | 73/505 |
| 3,705,534 | 12/1972 | Turck | 73/189 |

Primary Examiner—Herbert Goldstein
Attorney, Agent, or Firm—Saul Elbaum

[57] ABSTRACT

A device for detecting the surface angle-of-approach to a drain of an axisymmetric fluid streamline, with respect to a reference direction vector lying in a plane that is parallel to a surface, is provided. The device comprises essentially a base having at least a first and a second hole therein such that when fluid is allowed to flow through the first hole a pressure distribution is established in the near vicinity of the hole that is a function of the stream velocity and angle as well as the flow rate through said hole. The pressure at the second hole is a direct function of the angle of the fluid streamline attack vector with respect to a reference vector interconnecting the first hole to the second hole. The principal feature of this device is that it does not use a stagnation body in the fluid stream to measure the stream surface angle-of-approach to the drain. For greater measurement accuracy the device may be used in combination with another such that each set of two holes comprising the detector are located orthogonal to each other and each set is located in a direction parallel to a tangent to a fluid drain for the stream whereby vectors extended through each set enclose the drain.

6 Claims, 4 Drawing Figures

PATENTED JAN 14 1975  3,859,858
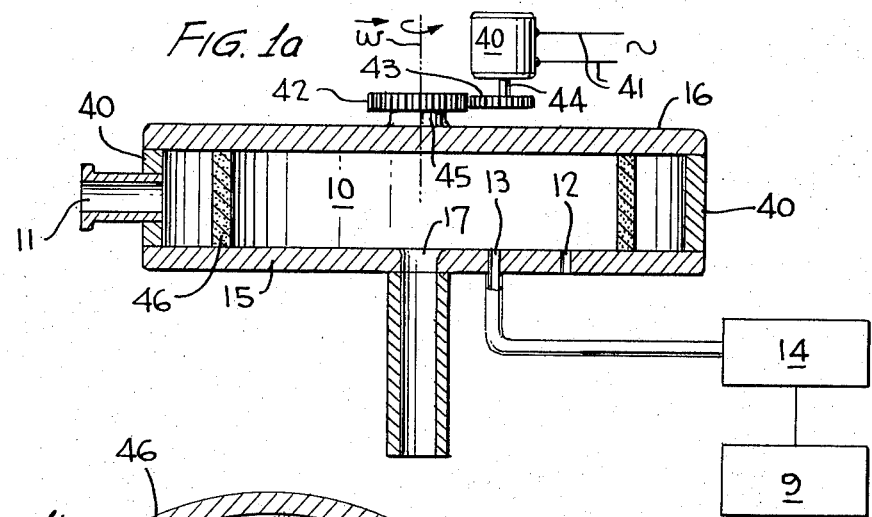
FIG. 1a
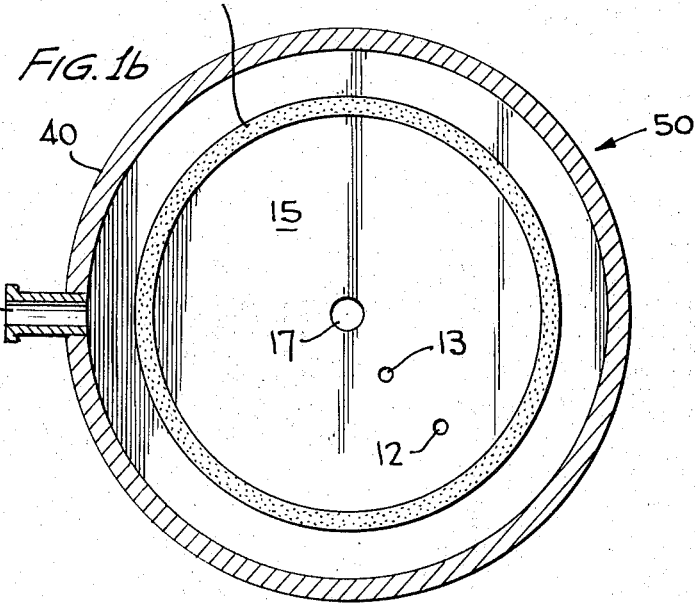
FIG. 1b
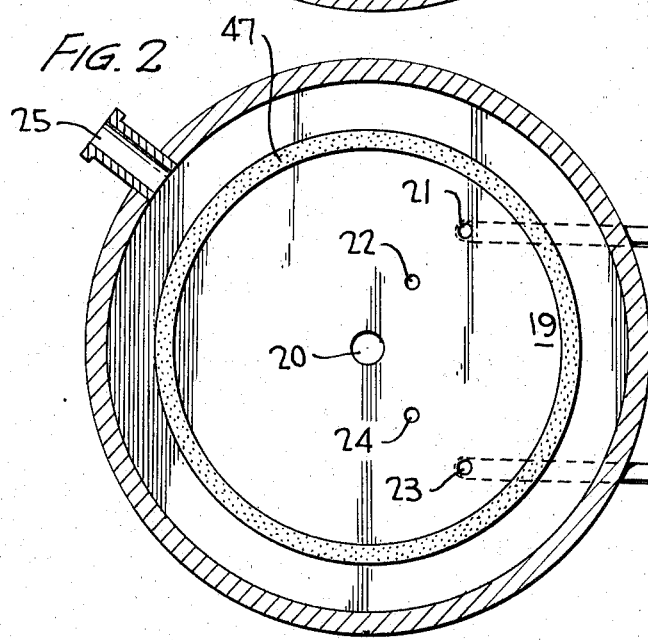
FIG. 2
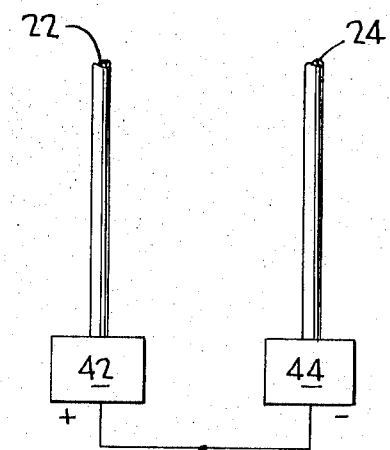
FIG. 3
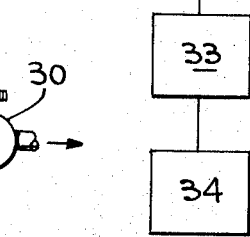

SURFACE ANGLE-OF-ATTACK DETECTOR

RIGHTS OF THE GOVERNMENT

The invention described herein may be manufactured, used, and licensed by or for the United States Government for governmental purposes without the payment to me of any royalty thereon.

BACKGROUND OF THE INVENTION

Heretofore surface angle-of-approach detectors in use have invariably required a stagnation body located in the fluid stream in order to provide an accurate measure of the surface angle-of-approach. Moreover, heretofore state-of-the-art pickoffs have had to be physically movable and adjustable or fabricated with extremely high precision in order to provide an acceptably small differential output for zero input to the flueric sensor used for measuring fluid flow around said pickoff.

Inherent in the manufacture of the adjustable pickoff and the requirement of extremely high precision is the reduction of the ruggedness of the pickoff. This results in a sensor whose null is unstable with respect to environmental changes. Stability of the pickoff with respect to environmental changes is a very important feature if a pickoff surface angle-of-approach detector is to be of much value.

In the fabrication of pickoffs with extremely high precision there is the additional drawback of extremely high developmental costs as well as the high cost of production of said devices.

It is therefore an object of this invention to provide a new and novel surface angle-of-approach detector which is extremely simple to fabricate and which alleviates the need for an angle-of-approach detector.

It is another object of this invention to provide a new and novel surface angle-of-approach detector which surpasses the ruggedness of present surface angle-of-approach detectors by virtue of its simple one-piece construction and absence of a body in the flow field.

It is yet an additional object of this invention to provide a new and novel surface angle-of-approach detector which may be manufactured by simply drilling two holes in a rigid flat surface.

It is still an additional object of this invention to provide a new surface angle-of-approach detector which when operated back to back provides for the adjustment of the bleed rates independently.

Still another additional object of this invention is to provide a new and novel surface angel-of-approach detector, which when operated back to back, may be nulled simply by matching the external flow resistances used to set the flow rates for each of the bleed holes.

These and other objects of the present invention will become more fully apparent with reference to the following specifications and drawings which relate to several variations of a preferred embodiment of the present invention.

SUMMARY OF THE INVENTION

In accordance with this invention a new and novel surface angle-of-approach detector is provided as an accurate means for sensing the fluid streamline angle-of-approach as measured in a plane parallel to the surface. This device comprises essentially a base having at least a first and a second hole located therein and means for monitoring the pressure of fluid flowing across said second hole. In this device fluid is allowed to flow through said first hole to establish a pressure distribution in the near vicinity of that hole. This pressure distribution is a function of the streamline velocity and angle as well as the flow rate through this hole. A second hole is located nearby said first hole. A means for measuring the pressure output of said second hole provides a direct measure of the streamline angle-of-approach. Two of these devices are operated back to back to provide a null adjustable surface angle-of-approach detector. The arrangement is such that two holes comprising the first angle-of-approach detector are located apart and along a direction parallel to a tangent to a drain hole and at an angle of 45° with respect to the direction for said fluid flow and said second detector has its holes located apart and along a direction tangent to said drain hole but orthogonal to said first direction. The outputs of the two pressure sensing means of each detector respectively are interconnected back to back.

BRIEF DESCRIPTION OF THE DRAWING

The specific nature of the invention as well as other objects, aspects, uses, and advantages thereof will clearly appear from the following description and from the accompanying drawings, in which:

FIG. 1a is a cross-sectional view of the invention in combination with a plenum having an input orifice and drain incorporated therein.

FIG. 1b is an illustration of a top view of the invention described herein in combination with a plenum having an input orifice and drain incorporated therein.

FIG. 2 is an illustration of the top view of an arrangement of two devices of the present invention used back to back as a null detector.

FIG. 3 is an illustration of a flow diagram for two transducer devices of the present invention connected back to back such that the combination operates as a null detector.

DESCRIPTION OF THE PREFERRED EMBODIMENT

The device and apparatus of the present invention will be easily understood in its broad aspects by reference to FIG. 1 wherein there is shown a cross-section of the device incorporated into a plenum 10 having an input orifice diffusion annulus, and drain. The plenum into which the device is incorporated is comprised of base 15, diffusion annulus 46, and cover 16. The plenum also incorporates a fluid input orifice 11 and a fluid drain 17 located in the base 15. The input orifice 11 is located and connected to the sidewall 40. The surface angle-of-approach detector comprises holes 12 and 13 located within base 15. Fluid moving across hole 13 provides a pressure which is measured by pressure transducing means 14. Pressure transducing means 14 is a pressure to electrical energy transducer which provides an electrical input to electrical readout 9. Electrical readout 9 provides a measure of the pressure at hole 13. The entire plenum structure above described is rotated at an angular velocity ω by angular motion producing means such as electric motor 40 connected by shaft 44 to gear 43 which cooperates with gear-shaft assembly 42 attached to the plenum cover 16. This rotation provides an axisymmetric flow field and vortex with the plenum 10.

In order to understand the exact operation of the device we now refer to FIG. 1b in which there is shown a plenum having sidewall 40, input orifice 11, and drain 17 located within base 15. For this particular embodiment of the invention, base 15 is flat. The invention comprises two holes 12 and 13 located in base 15 and a vector may be drawn from the center of hole 13 along the surface of base 15 to the center of hole 12. It is important to note that there is no actual flow through hole 13. As fluid flows through hole 12 a pressure distribution around hole 13 is created. Unless there is some flow through hole 12 the pressure at hole 13 is always the same regardless of stream direction. This pressure distribution is a direct function of the streamline velocity and angle of approach with respect to the vector interconnecting hole 12 to hole 13. In addition to this pressure distribution being a function of streamline velocity and angle it is also a function of the flow rate through hole 12. Permitting theta ($\theta$) to represent the angle between the vector interconnecting hole 13 to hole 12 and the streamline vector, the pressure at hole 13 is a direct function of the streamline angle-of-approach vector with respect to the vector connecting hole 13 to 12. Therefore, the pressure output from hole 13 is a direct function of the angle theta ($\theta$).

In FIG. 2 is shown an embodiment of the invention in which two surface angle-of-approach devices are incorporated into a plenum back to back. By back to back is meant the pressure transducing outputs of two of the devices are interconnected such that one signal opposes the other. In this way if the angle-of-approach vector of the streamline accurately disects the angle formed by vectors indicating the directions of each of the two sets of holes, there is no output from the pressure-to-electrical transducers.

In FIG. 2 holes 21 and 22 are essentially the same size and both are located along a directional line intersecting a radius of base 15. Holes 23 and 24 are also essentially the same size and located along a directional vector parallel to a line intersecting a radius of base 15. In the preferred embodiment, the directional vector for holes 23 and 24 is orthogonal to the directional vector for hole 21 and 22. Said vectors also preferably form an angle containing drain hole 20. Holes 21 and 23 are both equally spaced from the center of drain hole 20. The distance between holes 21 and 22 is equivalent to the distance between holes 23 and 24. The angular location of input orifice 25 with respect to drain hole 20 is immaterial.

Note: Holes 22 and 24 (or 13) may be made smaller than their corresponding upstream holes to increase the sensitivity of the corresponding sensors.

In FIG. 3 is shown a schematic diagram of the interconnection of the means for measuring the output pressure from holes 22 and 24 in a back to back arrangement. Fluid entering holes 21 and 23 have their respective flow rates adjusted by external resistances 30 and 31 respectively. No actual flow occurs through holes 22 and 24. Flow over hole 22 is transduced from pressure energy to electrical energy by means of pressure to electrical transducer 42 which is designed such that it provides a positive DC electrical output. Pressure as a result of flow over hole 24 is transduced from pressure energy into electrical energy by means of electrical to pressure transducer 44 which is designed such that it provides a proportional negative voltage signal proportionate to the pressure of the fluid permitted to interact with said transducer 44. The output electrical voltage signals from transducers 42 and 44 are interconnected such that if these electrical signals are equal no electrical signal is provided for electrical measuring means 33. Electrical measuring means 33 may be interconnected to a digital or other readout 34 which provides a measure of the pressure directly in Arabic characters or numerals.

It is to be understood that the inventor does not desire to be limited to the exact details of construction shown and described, for obvious modifications will occur to a person skill in the art.

What is claimed is:

1. In a fluid vortex device comprising a substantially cylindrical sidewall; a pair of substantially flat circular endwalls forming a base and a cover, respectively; said sidewall and endwalls defining a chamber; annular diffusion means within said chamber dividing same into an inner vortex chamber and an outer annular chamber; means for introducing fluid into said outer annular chamber through said sidewall, whereby said fluid will flow through said diffusion means into said vortex chamber; and axial fluid drain outlet means disposed in said base; the improvement comprising a pair of spaced apart orifices located in said base, said orifices lying on a vector which does not pass through the center of said drain, the outermost of said pair of orifices defining means for bleeding fluid from said chamber to thereby establish a pressure distribution across the innermost of said pair of orifices, and means for detecting the pressure distribution across said innermost orifice.

2. The device of claim 1 wherein said orifices are equal in size.

3. The device of claim 1 wherein said innermost orifice is smaller than said outermost orifice.

4. The device of claim 1, wherein said orifices are substantially smaller in cross-section than said drain outlet means.

5. The device of claim 1, further comprising a second pair of spaced apart orifices located in said base and lying on a vector intersecting a radius of said circular base and intersecting said first-mentioned vector, the outermost of said second pair of orifices defining means for bleeding fluid from said chamber, and second means for detecting the pressure distribution across the innermost of said second pair of orifices, both of said pressure detecting means being connected in back-to-back arrangement.

6. The device of claim 5, wherein said first-mentioned vector and said second-mentioned vector are orthogonal to each other and form an angle containing said drain outlet means.

* * * * *

PO-1050
(5/69)

UNITED STATES PATENT OFFICE
CERTIFICATE OF CORRECTION

Patent No. 3,859,858                 Dated   Jan. 14, 1975

Inventor(s)   Arthur J. Ostdiek

It is certified that error appears in the above-identified patent and that said Letters Patent are hereby corrected as shown below:

Page 1, column 1, add:

Assignee:    The United States of America as represented by the Secretary of the Army, Washington, D.C.

Signed and sealed this 29th day of April 1975.

(SEAL)
Attest:

RUTH C. MASON                 C. MARSHALL DANN
Attesting Officer            Commissioner of Patents
                                      and Trademarks